Patented Apr. 13, 1937

2,076,524

UNITED STATES PATENT OFFICE 2,076,524

TREATMENT OF MOTOR FUEL

Fred B. Behrens, Chicago, Ill., assignor to Universal Oil Products Company, Chicago, Ill., a corporation of Delaware No Drawing. Application May 22, 1933, Serial No. 672,230. Renewed September 14, 1936

2 Claims. (Cl. 44—9)

This invention relates to the treatment of gasoline and refers more particularly to the treatment of cracked gasolines or gasolines containing a substantial proportion of cracked constituents though it is to some extent applicable to all types of motor fuel.

In a more specific aspect the invention has reference to a process which has for its object the treatment of gasolines subject to deterioration under storage conditions in respect to such desirable qualities as color, gum content and anti-knock value, the succeeding specification disclosing the particular nature of the process and giving examples of its beneficial effects.

The relative instability of cracked hydrocarbon motor fuels as contrasted with similar boiling range fractions occurring in crude petroleums and separable therefrom by simple distillation has been a matter of common observation from the time that cracked products became a substantial factor in the gasoline trade. The causes of this instability are attributable primarily to the presence of highly unsaturated olefins such as conjugated diolefins and triolefins which have known tendencies to polymerize and form high boiling gummy or resinous substances. While the reactions leading to this development of gum and color content are probably not of a simple character, the general hypothesis of polymerization offers an explanation of gasoline deterioration which is borne out to a large extent by the data obtained by chemical analyses and physical tests.

Primary attempts to effect the necessary stabilization and refinement of cracked gasolines consisted in treating out the offending substances which included certain sulphur compounds as well as the olefins mentioned, such treatments being effected by using sulphuric acid of graded strength, following the treatment by neutralization and redistillation to leave behind heavy reaction products and produce an overhead fuel of desired boiling range.

The defects in this system of treatment are more or less obvious and have been emphasized as the refining art developed and greater economies were necessary in the production of stable marketable gasoline. Not only are olefins lost by polymerization and solution in the acid but when sufficient sulphuric acid is used to reduce the sulphur content, reduction and loss of acid may occur and also fixation of sulphur in sulphuric acid esters.

It is a primary object of the present invention to eliminate by a novel method of treatment some of the losses ordinarily incurred when stabilization of cracked products is effected by removal of the polymerizable constituents. Experience has shown that the polymerization of highly unsaturated hydrocarbons is induced by oxygen, particularly when they are also under the influence of light. The reactions of polymerization have been shown to be preceded by the formation of organic peroxides by the direct addition of oxygen to the unsaturated hydrocarbons. While the percentage of such peroxides may be extremely small, it has been found that they evidently act to instigate a series of chain reactions among the olefins which lead ultimately to the formation of heavy polymers.

To overcome the effect of oxygen use has been made of certain readily oxidizable organic compounds in relatively small amounts to negative the effect of the peroxides, such substances being known as inhibitors and frequently giving entire satisfaction when used in proper amounts in stored gasolines. In the case of extremely unstable gasolines, however, and particularly gasolines that have been stored under oxidizing influences prior to the use of inhibitors or other stabilizing treatment, it frequently happens that formation of peroxides and the initial reactions of polymerization have proceeded to such an extent that either inhibitors are without effect or they must be used in excessive amounts or repeated doses.

In one specific embodiment the present invention comprises treatment of gasolines to remove organic peroxides therefrom by treatment with magnesium oxide produced by calcination of the carbonate, particularly the mineral magnesite.

The term organic peroxides as used in the preceding paragraph includes a class of substances in which oxygen is combined directly with hydrocarbon double bonds, such compounds being of a relatively unstable character and tending to act as intermediate compounds for the transmission of oxygen to other unsaturates by a series of chain reactions which results in the formation of gums and colored compounds and in corresponding loss in anti-knock value in the case of cracked gasolines insofar as olefins within the boiling range of gasoline are polymerized. However, the exact chemical nature and structural character of these compounds is hard to determine in the case of complex hydrocarbon mixtures such as gasoline and the interpretation of the term as used is not to be restricted to compounds of a definite peroxide character but is to include various types of compounds containing more or less loosely combined oxygen which function as promoters of oxidation and polymerization reactions. The process of the invention effects to a large extent the removal of the broad class of compounds comprised within the scope of this definition.

A method for determining the peroxide number as a measure of the active oxygen in gasoline is briefly as follows: 50 cc. of a solution of ferrous sulphate ($FeSO_4$) and ammonium sulfo cyanate ($NH_4CNS$), the latter acting as indicator, are shaken in the cold for about 5 minutes with 10 cc. of gasoline to be tested. The aqueous layer is then separated and titrated immediately by a 0.01 normal solution of titanous chloride ($TiCl_3$) until the loss of color (due originally to the formation of ferric sulfo cyanate) shows that the iron oxidized by the peroxides has been again reduced to the ferrous condition.

As a general rule gasolines showing a peroxide number of 2.0 (1 peroxide number is a gram equivalent of active oxygen per 1,000 liters) are in an unstable condition and subject to relatively rapid deterioration in respect to color and gum content. The peroxide number alone, however, does not permit absolutely accurate prediction of the rate and character of the deterioration of the gasoline, since two samples having the same peroxide number may be at different stages of deterioration, one having substantially no pre-formed gums while the other has a considerable quantity. The character of the peroxides themselves will also vary with the character of the original hydrocarbons from which they were formed.

I have found that magnesium oxide produced by calcining magnesite at a proper temperature constitutes an effective reagent for reducing the content of active oxygen in gasolines and thus rendering them more stable in storage and more easily susceptible to the action of inhibitors. Treatments may be conducted at ordinary temperatures either by percolating the gasoline downwardly through a stationary mass of the calcined material of a suitable degree of fineness or by stirring the powder with the gasoline, after which it is allowed to settle and is either decanted or filtered to complete the removal of suspended particles.

Magnesite decomposes at approximately 350° C. to liberate carbon dioxide and yield a porous mass consisting in part of magnesium oxide, calcium oxide and some silica, which is the preferred treating agent of the present process. For best results the material thus produced is protected from contact with moist air or from substances which it may adsorb prior to its use as a treating and contacting agent, since the effectiveness of the treatment evidently depends to some extent upon the porosity and adsorptive properties of the particles as in other porous contact materials used either to effect polymerization or catalytic reactions. In the case of percolation treatments the oxide may be ground and sized to include particles of from approximately 20 to 80 mesh size while in the case of contact treatments in which the material is stirred or circulated with the gasoline the oxide may be ground to a much finer size approaching a dust or an impalpable powder. The method of application and the fineness, as well as the time of contact, etc. will vary with the activity of the particles and the need for more or less extensive treatment of the gasoline.

Apparently burned magnesite exerts a peculiar and selective action in removing active oxygen addition compounds from gasolines. The explanation for this observed fact may reside in the combined alkaline and porous character of the material which both neutralizes acidic compounds and induces rapid polymerization of the more sensitive unsaturated hydrocarbons so that they are removed from the gasoline and the tendency to oxygen absorption is reduced. This theory of the mechanism of the reaction involved is not offered as a complete explanation of the observed treating effects, since it would be difficult and impractical to attempt to prove it by analytical procedure.

The destruction of the peroxides in a gasoline may in some instances be followed by a restoration of properties in case polymerization and gum-forming reactions have not proceeded to too great an extent. Gasolines thus "de-oxidized" are found to be much more susceptible to the action of inhibitors. In some cases gasolines containing active oxygen beyond a certain point are not capable of being protected by ordinary inhibitors against further and frequently serious deterioration in their desirable characteristics. The invention thus stands in one aspect as a method of restoring cracked gasolines which have been stored for some time to a condition in which they are readily amenable to protection by anti-oxidants.

The treatments according to the present invention are many times sufficient to render a gasoline stable or at least sufficiently capable of being protected by inhibitors. However, the use of other chemical and physical treatments in conjunction with the present process is not precluded but such may be employed when necessary to insure a final product which is satisfactory in all respects. Thus, ordinary light sulphuric acid and caustic soda treatments and sweetening with sodium plumbite or other chemical reagents may be employed either before or after the special treatments comprised within the scope of the present invention.

The following series of tests is introduced to show results obtainable by the process in one particular instance:

| Treatment | Peroxide No. | Induction period | | Copper dish gum | |
|---|---|---|---|---|---|
| | | Without inhibitor | With 0.025% inhibitor | Without inhibitor | With 0.025% inhibitor |
| Untreated gasoline | 6.6 | Min. 70 | Min. 185 | Mgs. 61 | Mgs. 48 |
| Percolated through burned magnesite, Sample No. 1 | 0.87 | 55 | 380 | 125 | 68 |
| Percolated through burned magnesite, Sample No. 2 | 0.67 | 60 | 420 | 95 | 40 |

The foregoing figures show that percolation through burned magnesite reduced the peroxide number of the gasoline and rendered it more readily subject to the action of an inhibitor in respect to induction period in the oxygen bomb test and in respect to gum content as determined by the ordinary copper dish evaporation method. The yield of treated gasoline per ton of burned magnesite was of the order of 5,000 to 8,000 barrels, which represents a relatively high yield so that the process is evidently efficient from all standpoints.

The foregoing specification clearly shows the novelty and utility of the invention and the results obtainable by its use. The invention, however, is broad in scope and not limited to the exact descriptive material nor the particular numerical data given.

I claim as my invention:

1. A method for restoring deteriorated cracked gasoline containing organic peroxides formed during the deterioration and for stabilizing the gasoline against further deterioration, which comprises eliminating the peroxides from the gasoline by treating the latter with burned magnesite, whereby the amenability of the gasoline to the action of inhibitors is improved, and then adding an inhibitor to the gasoline.

2. A method for restoring deteriorated cracked gasoline containing organic peroxides formed during the deterioration and for stabilizing the gasoline against further deterioration, which comprises eliminating the peroxides from the gasoline by treating the latter with magnesium oxide, whereby the amenability of the gasoline to the action of inhibitors is improved, and then adding an inhibitor to the gasoline.

FRED B. BEHRENS.